United States Patent
Shaw (10) Patent No.: US 9,674,851 B2
(45) Date of Patent: *Jun. 6, 2017

(54) SYSTEMS AND METHODS FOR MANAGING PDP CONTEXTS IN A WIRELESS DATA COMMUNICATIONS NETWORK

(71) Applicant: AT&T Mobility II LLC, Atlanta, GA (US)

(72) Inventor: Venson Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/690,904

(22) Filed: Apr. 20, 2015

(65) Prior Publication Data

US 2015/0230264 A1 Aug. 13, 2015

Related U.S. Application Data

(63) Continuation of application No. 13/455,805, filed on Apr. 25, 2012, now Pat. No. 9,042,390, which is a (Continued)

(51) Int. Cl.
*H04L 12/28* (2006.01)
*H04W 72/08* (2009.01)
(Continued)

(52) U.S. Cl.
CPC ......... *H04W 72/087* (2013.01); *H04W 76/02* (2013.01); *H04W 76/066* (2013.01);
(Continued)

(58) Field of Classification Search
USPC ................. 370/278, 252, 329, 401
See application file for complete search history.

(56) References Cited

U.S. PATENT DOCUMENTS 6,711,141 B1 3/2004 Rinne et al.
6,754,214 B1 6/2004 Mahalingaiah
(Continued)

FOREIGN PATENT DOCUMENTS

CN 101426227 A 5/2009
EP 1220496 7/2002
(Continued)

OTHER PUBLICATIONS

Notice of Allowance mailed Jan. 25, 2012 in U.S. Appl. No. 12/707,791.
(Continued)

*Primary Examiner* — John Pezzlo
(74) *Attorney, Agent, or Firm* — Hartman & Citrin LLC (57) ABSTRACT

Systems and method are for managing packet data protocol (PDP) contexts in a wireless data communications network. A plurality of real-time applications are prioritized within a single, shared PDP context or allocated a second PDP context based upon priority levels logically assigned to the plurality of applications such that high priority applications are delivered before lower priority applications. Lower priority applications are suspended and interrupted by higher priority applications and are set to resume after the higher priority applications are completed. Priority levels are established by a priority management engine (PME) that may reside in one or more network elements, such as a General Packet Radio Service (GPRS) Support Node or a network probe system. The priority management engine establishes the priority levels based upon one or more factors including, for example, PDP utilization characteristics at a given time and/or given network location, and/or user preferences.

20 Claims, 3 Drawing Sheets

Related U.S. Application Data continuation of application No. 12/707,791, filed on Feb. 18, 2010, now Pat. No. 8,184,560.

(51) Int. Cl.
| | | |
|---|---|---|
| *H04W 76/02* | (2009.01) | |
| *H04W 76/06* | (2009.01) | |
| *H04J 1/16* | (2006.01) | |
| *H04W 80/04* | (2009.01) | |
| *H04L 29/08* | (2006.01) | |

(52) U.S. Cl.
CPC ......... *H04L 67/322* (2013.01); *H04W 76/022* (2013.01); *H04W 80/04* (2013.01)

(56) References Cited

U.S. PATENT DOCUMENTS

| | | | |
|---|---|---|---|
| 7,433,961 B2 | 10/2008 | Munje et al. | |
| 7,693,126 B2 | 4/2010 | Cayla et al. | |
| 7,957,393 B2* | 6/2011 | Lundin | H04L 12/5695 |
| | | | 370/338 |
| 9,094,538 B2* | 7/2015 | Mohammed | H04M 15/70 |
| 2004/0223602 A1 | 11/2004 | Honkasalo et al. | |
| 2005/0100021 A1 | 5/2005 | Suomi | |
| 2007/0167182 A1 | 7/2007 | Tenhunen et al. | |
| 2008/0037491 A1 | 2/2008 | Shaheen | |
| 2009/0052384 A1* | 2/2009 | Zisimopoulous | H04L 47/14 |
| | | | 370/329 |
| 2009/0279489 A1 | 11/2009 | Deu-Ngoc et al. | |
| 2011/0171953 A1* | 7/2011 | Faccin | H04W 48/08 |
| | | | 455/426.1 |
| 2013/0273855 A1* | 10/2013 | Cherian | H04W 4/005 |
| | | | 455/68 |
| 2014/0192751 A1 | 7/2014 | Oksala et al. | |

FOREIGN PATENT DOCUMENTS

| | | |
|---|---|---|
| EP | 1783961 | 5/2007 |
| KR | 100463530 | 12/2004 |
| WO | 0078080 | 12/2000 |
| WO | 2006071155 | 7/2006 |
| WO | 2011001355 | 7/2011 |

OTHER PUBLICATIONS

English translation of Office Action mailed Sep. 28, 2014 in Chinese Patent Application No. 201180007006.6.
International Search Report mailed May 19, 2011 in PCT Application No. PCT/US2011/025384.
International Preliminary Report on Patentability and Written Opinion mailed Aug. 12, 2012 in PCT Application No. PCT/US2011/025384.
U.S. Office Action dated Sep. 25, 2014 in U.S. Appl. No. 13/455,805.
U.S. Notice of Allowance dated Jan. 9, 2015 in U.S. Appl. No. 13/455,805.

* cited by examiner

SYSTEMS AND METHODS FOR MANAGING PDP CONTEXTS IN A WIRELESS DATA COMMUNICATIONS NETWORK

CROSS REFERENCE TO RELATED APPLICATION

This application is a continuation of U.S. patent application Ser. No. 13/455,805, filed Apr. 25, 2012, now U.S. Pat. No. 9,042,390, which is a continuation of U.S. patent application Ser. No. 12/707,791, filed Feb. 18, 2010, now U.S. Pat. No. 8,184,560, wherein the entirety of each is herein incorporated by reference.

TECHNICAL FIELD

The present disclosure relates generally to data communications networks and, more particularly, to systems and methods for managing packet data protocol (PDP) contexts in wireless data communications networks.

BACKGROUND

A PDP context provides a packet data connection over which a mobile device and a data network can exchange Internet protocol (IP) packets. A PDP context has a record of parameters that consists of all the required information for establishing an end-to-end connection with the data network. These parameters include a PDP type, a PDP address type, a Quality of Service (QoS) profile request (e.g., QoS parameters requested by a user), a QoS profile negotiated by the data network, an authentication type, and a Domain Name System (DNS) type (e.g., dynamic DNS or Static DNS).

The PDP Context is mainly designed to provide two specific functions for the mobile device. The PDP Context is designed to allocate a PDP address, either an IP version 4 or an IP version 6 type address, to the mobile device. The PDP context is also used to make a logical connection with a QoS profile, the set of QoS attributes negotiated for and utilized by one PDP context, through the data network.

Current, high-end mobile devices are capable of establishing multiple PDP contexts to serve parallel applications. These PDP contexts can differ in their QoS parameters and/or the target data network to which they provide a data connection. By way of example, a mobile device can establish a first PDP context to access the Internet through a web browser and a second PDP context to access an application provided by an application server.

Generally speaking, there are two types of PDP contexts, a primary PDP context, and a secondary PDP context. A primary PDP context has a unique associated IP address. Primary PDP contexts can be activated or deactivated independently from one another. A secondary PDP context is created based upon a primary PDP context and shares an IP address with a primary PDP context. A secondary PDP context is always associated with a primary PDP context. A PDP address (IP address) and access point (AP) is re-used from the primary PDP context. Thus, the primary and the associated secondary PDP context provide connection to the same packet data network with different guaranteed QoS.

One primary PDP context might have multiple secondary contexts assigned. Each PDP context has its own radio access bearer (RAB) and tunnel to transfer user plane data. The primary PDP context has to be active prior to activating an associated secondary PDP context. Any secondary PDP context can be deactivated while keeping the associated primary context and any eventual other secondary PDP contexts active. If a primary PDP context is deactivated, this will also deactivate all the assigned secondary PDP contexts. In 3GPP (3$^{rd}$ Generation Partnership Project) networks, a total of 11 PDP contexts, including any combination of primary and secondary PDP contexts, may coexist simultaneously.

Each of multiple PDP contexts can have different QoS profiles. A primary PDP context is a normal PDP context with default QoS profile attributes and it is always activated first. For the multiple primary PDP contexts, each context has a different PDP address and is used to attach to a different Packet Data Network (PDN) identified by a different Access Point Name (APN).

An APN is used in 3GPP data access networks (e.g., General Packet Radio Service (GPRS) or Evolved Packet Core (EPC) networks) to identify an IP PDN with which a mobile device communicates, and to define a type of service provided by the PDN. For example, an APN may identify a connection to an IP Multimedia Subsystem (IMS), a messaging service center (e.g., a Multimedia Messaging Service Center (MMSC)), a wireless application protocol (WAP) server, the Internet, an application server, or another device, node, and/or service.

In a PDN, an operator's packet domain network is responsible for providing data connectivity to the mobile user. The user accesses one or more PDNs, provided by the operator or an external network provided by another operator. Exemplary PDNs include, but are not limited to, networks providing IMS services, MMS services, WAP services, Internet services, and visual voicemail (VVM) services. A Gateway GPRS Support Node (GGSN) provides connectivity between one or more PDNs and the operator's packet domain network. In general, a user accesses a PDN via a GGSN, which may be located in a visited operator's network, or may be located in the user's home operator's network. In some circumstances, inter-operator networks provide IP connectivity between operators' packet domain networks.

An APN is used to identify the PDN from which to provide the user's IP address. It is also used to select a GGSN from which the PDN is accessible. APN resolution is the process of DNS look-up to determine the IP address of the GGSN that provides connectivity to the PDN identified by the APN. When a GPRS mobile device activates a PDP context, the mobile device provides the APN to which the mobile device wants to connect. The APN is resolved to identify and to select the appropriate GGSN, and to provide an IP address to the mobile device. When a mobile device sets up a PDP context, the access point is selected and an APN is determined. This access point is then used in a DNS query to a private DNS network. This process gives the IP address of the GGSN which should serve the access point. At this point a PDP context can be activated.

SUMMARY

The innovative systems and methods described herein are for managing packet data protocol (PDP) contexts in a wireless data communications network. A plurality of real-time applications are prioritized within a single, shared PDP context, or are allocated a second PDP context based upon priority levels logically assigned to the plurality of applications, such that high priority applications are delivered before lower priority applications. Lower priority applications are suspended and interrupted by higher priority applications and are set to resume after the higher priority applications are completed. Priority levels are established by a priority management engine (PME) that may reside in one or more network elements, such as a General Packet Radio Service (GPRS) Support Node (e.g., a GGSN or SGSN) or a network probe system. The priority management engine establishes the priority levels based upon one or more factors including, for example, PDP utilization characteristics at a given time and/or given network location, and/or user preferences.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

Figure 1:
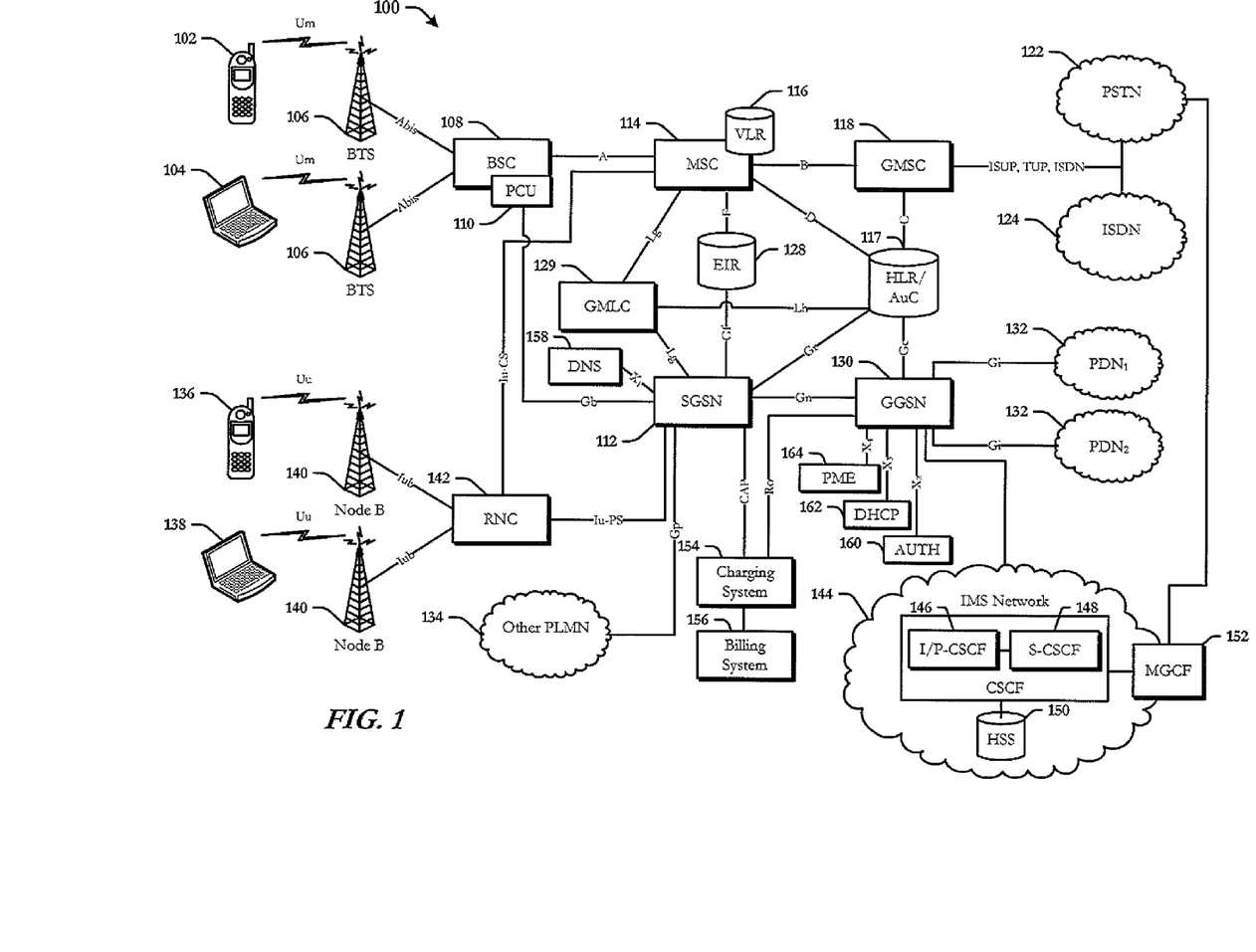
FIG. 1 schematically illustrates a communications network in which some embodiments of the present disclosure may be implemented.

Referring now to the drawings in which like numerals represent like elements throughout the several views, FIG. 1 schematically illustrates an exemplary communications network 100. The communications network 100 includes two radio access networks (RANs). A first RAN, illustrated in the upper left hand portion of FIG. 1, is dedicated to GSM-based network access. A second RAN, illustrated in the lower left hand portion of FIG. 1, is dedicated to UMTS-based network access. The innovative aspects of the present disclosure may be implemented in alternative networks that use other access technologies, as described above. The first RAN is now described.

The illustrated communications network 100 includes a first Mobile Station (MS) 102 and a second MS 104 that are each in communication with a Base Transceiver Station (BTS) 106 via the Um radio (air) interface. The BTSs 106 are terminating nodes for the radio interface in the illustrated first RAN. Each BTS 106 includes one or more transceivers and is responsible for ciphering of the radio interface.

In the illustrated embodiment, the first MS 102 is a mobile device and the second MS 104 is a computer, such as a laptop with an integrated or external, removable GSM access card. Each MS 102, 104 includes mobile equipment, such as, but not limited to, one or more of keyboards, screens, touch screens, multi-touch screens, radio transceivers, circuit boards, processors, memory, Subscriber Identity Modules (SIM), Universal SIMs (USIM), or Universal Integrated Circuit Card (UICC) that contains subscriber information to enable network access to the wireless telecommunications network 100, and the like.

Each BTS 106 is in communication with a Base Station Controller (BSC) 108 via the Abis interface. Typically, a BSC has tens or even hundreds of BTSs under its control. The BSC 108 is configured to allocate radio resources to the MSs 102, 104, administer frequencies, and control handovers between BTSs 106 (except in the case of an inter-Mobile Switching Center (MSC) handover in which case control is in part the responsibility of the MSC). One function of the BSC 108 is to act as a concentrator, so that many different low capacity connections to the BTS 106 become reduced to a smaller number of connections towards the MSC. Generally, this means that networks are often structured to have many BSCs 108 distributed into regions near the BTSs 106, which are in turn connected to large centralized MSC sites. Although illustrated as a distinct element, the functions provided by the BSC 108 may alternatively be incorporated in the BTS 106. The Abis interface is eliminated in such a configuration.

The BSC 108 is logically associated with a Packet Control Unit (PCU) 110 when GPRS capabilities are employed. The PCU 110 is configured to support radio related aspects of GPRS when connected to a GSM network. The PCU 110 is in communication with a Serving GPRS Support Node (SGSN) 112 via the Gb interface. The SGSN 112 records and tracks the location of each mobile device (e.g., MSs 102, 104) in the wireless telecommunications network 100. The SGSN 112 also provides security functions and access control functions.

The BSC 108 is also in communication with an MSC 114 via an A interface. The MSC 114 is configured to function as a telecommunications switch. The MSC 114 is in communication with location databases, such as a Visiting Location Register (VLR) 116 and a Home Location Register (HLR) 117. The VLR 116 may be logically associated with the MSC 114 as illustrated or may be provided as a separate network element in communication with the MSC 114. The VLR 116 is a database configured to store all subscriber data that is required for call processing and mobility management for mobile subscribers that are currently located in an area controlled by the VLR 116.

The HLR 117 is in communication with the MSC 114 and VLR 116 via the D interface. The HLR 117 is a database configured to provide routing information for mobile terminated calls and various messaging communications. The HLR 117 is also configured to maintain subscriber data that is distributed to the relevant VLR (e.g., the VLR 116) or the SGSN 112 through an attach process and to provide mobility management procedures, such as location area and routing area updates. The HLR 117 may be logically associated with an Authentication Center (AuC) as illustrated or may be provided as a separate network element in communication with the HLR 117.

The AuC is configured to authenticate each UICC/SIM/USIM that attempts to connect to the wireless telecommunications network 100, for example, when a mobile device is powered on. Once authenticated, the HLR 117 is allowed to manage the UICC/SIM/USIM and services provided to the MS 102, 104. The AuC also is capable of generating an encryption key that is used to encrypt all wireless communications between the MS 102, 104 and the communications network 100.

The MSC 114 is also in communication with a Gateway MSC (GMSC) 118 via the B interface. The GMSC 118 is configured to provide an edge function within a Public Land Mobile Network (PLMN). The GMSC 118 terminates signaling and traffic from a Public Switched Telephone Network (PSTN) 122 and an Integrated Service Digital Network (ISDN) 124, and converts the signaling and traffic to protocols employed by the mobile network. The GMSC 118 is in communication with the HLR/AuC 117 via the C interface to obtain routing information for mobile terminated calls originating from fixed network devices such as, for example, landline telephones that are in communication with the mobile network via the PSTN 122.

The MSC 114 is also in communication with an EIR (Equipment Identity Register) 128 via an F interface. The EIR 128 is a database that can be configured to identify subscriber devices that are permitted to access the wireless telecommunications network 100. An IMEI (International Mobile Equipment Identity) is a unique identifier that is allocated to each mobile device and is used to identify subscriber devices in the EIR 128. The IMEI includes a type approval code, a final assembly code, a serial number, and a spare digit. An IMEI is typically placed in the EIR 128 once its operation has been certified for the infrastructure of the network 100 in a laboratory or validation facility.

The SGSN 112 and the MSC 114 are also in communication with a gateway mobile location center (GMLC) 129 via an Lg interface. The GMLC 129 can communicate with the HLR/AUc 117 via an Lh interface to acquire routing information.

The EIR 128 and the HLR/AuC 117 are each in communication with the SGSN 112 via the Gf interface and the Gr interface, respectively. The SGSN 112, in turn, is in communication with a GGSN (Gateway GPRS Support Node) 130 via the Gn interface. The GGSN 130 is configured to provide an edge routing function within a GPRS network to external PDNs (Packet Data Networks) 132, such as the Internet and one or more intranets, for example. The GGSN 130 is in communication with the PDN 132 via the Gi interface. The GGSN 130 includes firewall and filtering functionality. The HLR/AuC 117 is in communication with the GGSN 130 via the Gc interface.

The SGSN 112 is also in communication with other PLMNs 134 via an external GGSN (not shown). The external GGSN provides access to the other PLMNs 134. The other PLMNs 134 may be, for example, a foreign network, such as, a wireless telecommunications network operated by another service provider or the same service provider.

The second RAN, illustrated in the lower left hand portion of FIG. 1, is dedicated to UMTS-based network access and is now described. The illustrated wireless telecommunications network 100 also includes a first UE (User Equipment) 136 and a second UE 138 that are each in communication with a Node B 140 via the Uu radio (air) interface. The Node B 140 is the terminating node for the radio interface in the second RAN. Each Node B 140 includes one or more transceivers for transmission and reception of data across the Uu radio interface. Each Node B 140 is configured to apply the codes to describe channels in a CDMA-based UMTS network. Generally, the Node B 140 performs similar functions for the UMTS network that the BTS 106 performs for the GSM network.

In the illustrated embodiment, the first UE 136 is a mobile phone (e.g., the mobile device 102) and the second UE 138 is a computer, such as a laptop with an integrated or external, removable UMTS card. Each UE 136, 138 includes mobile equipment, such as one or more of keyboards, screens, touch screens, multi-touch screens, radio transceivers, circuit boards, processors, memory, SIMs, USIMs, or UICCs that contains subscriber information to enable network access to the wireless telecommunications network 100, and the like. Generally, the UE's 136, 138 perform similar functions in the UMTS network that the MS's 102, 104 perform in the GSM network.

Each Node B 140 is in communication with a Radio Network Controller (RNC) 142 via the Iub interface. The RNC 142 is configured to allocate radio resources to the UE's 136, 138, administer frequencies, and control handovers between Node Bs 140 (and others not shown). Although illustrated as a distinct element, the RNC 142 functions may alternatively be located within the Node Bs 140. In this configuration the Iub interface is eliminated. Generally, the RNC 142 performs similar functions for the UMTS network that the BSC 108 performs for the GSM network.

The RNC 142 is in communication with the MSC 114 via an Iu-CS interface. The RNC 142 is also in communication with the SGSN 112 via an Iu-PS interface. The other network elements perform the same functions for the UMTS network as described above for the GSM network.

The communications network 100 also includes an IP Multimedia Subsystem (IMS) network 144. The IMS network 144 includes Call State Control Functions (CSCFs), such as, a Proxy-CSCF (P-CSCF), an Interrogating-CSCF (I-CSCF), and a Serving-CSCF (S-CSCF). A P-CSCF is the first contact point in the IMS network 144 for a UE and routes incoming communications to the I-CSCF. The I-CSCF determines which S-CSCF is serving the communication and routes the communication to that S-CSCF, which performs registration, session control, and application interface functions. The P-CSCF and the I-CSCF are illustrated as a combined I/P-CSCF 146 and the S-CSCF 148 is illustrated as a stand-alone element. Other CSCF configurations are contemplated.

The IMS network 144 also includes a Home Subscriber Server (HSS) 150, which is a master user database that supports the IMS network 144 core network elements. The HSS 150 stores subscription-related information, such as subscriber account details and subscriber profiles, performs authentication and authorization of the user, and provides information about a subscriber's location and IP address. It is similar to the GSM HLR and AuC, described above as the combination HLR/AuC 117.

The IMS network 144 also includes a Media Gateway Control Function (MGCF) 152, which provides call control protocol conversions between the ISUP (ISDN User Part) protocol used by the PSTN 122 and the SIP (Session Initiation Protocol) used by the IMS network 144.

Referring back to the SGSN 112, it is shown that the SGSN 112 is in communication with a charging system 154 via a CAP interface. The GGSN 130 is also in communication with the charging system 154, via an Ro interface. The charging system 154, in turn, is in communication with a billing system 156.

Briefly, the charging system 154 is responsible for offline and online charging of subscriber accounts. The charging system 154 may be deployed to provide charging rule functions for prepaid and/or postpaid network platforms. The single charging system 154 is illustrated for simplicity, however separate charging systems are contemplated and may be utilized if desired by the operating service provider.

The billing system 156 is responsible for billing postpaid customers and handling payments received for service provisioned for both postpaid and prepaid accounts in the network 100. Like the charging system 154, the billing system 156 may alternatively be designed as two separate entities for postpaid and prepaid applications.

The SGSN 112 is also in communication with a Domain Name System (DNS) server 158 via an exemplary $X_1$ interface. The SGSN 112, the DNS server 158 and the GGSN 130 communicate with one another during a PDP context activation sequence.

An exemplary PDP context activation sequence begins when a requesting mobile device (e.g., one of devices 102, 104, 136, 138) initiates the PDP context activation sequence to obtain the IP address for the device. The APN specified by the APN is passed as a parameter in an activate PDP context message. A service identification (service ID) is also included in the activate PDP context message. The service ID identifies the service the requesting mobile device is attempting to access. Upon receipt of the activate PDP context message, the SGSN 112 initiates a DNS query to the DNS server 158 to resolve an IP address for the GGSN (e.g., the GGSN 130) corresponding to the APN. The DNS server 158 provides the GGSN IP address to the SGSN 112, which uses the IP address to initiate a create PDP context request to the GGSN 130 corresponding to the APN.

The GGSN 130 is also in communication with an authentication server 160 via an exemplary $X_2$ interface, a Dynamic Host Configuration Protocol (DHCP) server 162 via an exemplary $X_3$ interface, and a priority management engine (PME) 164 via an exemplary $X_4$ interface. The GGSN 130 authenticates GPRS subscription information with the authentication server 160. The authentication server 160 operates using the RADIUS protocol or the DIAMETER protocol to authenticate subscription information prior to allowing a requesting mobile device to activate a PDP context. The authentication server 160 then notifies the GGSN 130 of the success/failure of the subscription authentication. Upon receiving notification of a successful authentication, the GGSN 130 communicates with the DHCP server 162 to retrieve a dynamic IP address for use in the PDP context. The GGSN 130 then requests a priority level for the service identified in the service ID from the PME 164.

The PME 164 is configured to store priority levels for services offered by the service provider including, but not limited to, visual voicemail (VVM) service, Internet access, audio streaming, video streaming, online gaming, Internet television, and other applications that require a data connection. While priorities may be established for any application that utilizes a data connection, priorities established for applications that are time-sensitive, delay-sensitive, location-specific, network resource intensive, or some combination thereof may experience greater benefit from the disclosed systems and methods.

A user may assign priority levels to data applications operating on their device. The device may upload the priority levels to the PME 164 for consideration during a PDP context activation sequence, as described in greater detail below with reference to FIG. 3.

Alternatively, a service provider may assign priority levels for data applications based upon various factors including, for example, network load information retrieved from network analysis equipment (e.g., network probes, BTSs, MSCs, hardware/software components used in cell site planning and/or maintenance, and the like), geographical factors, and subscriber feedback regarding slow, poor, or no connection. In addition, service providers may seek to optimize subscriber experiences for certain applications. For example, a service provider may assign a top priority level to VVM service such that a VVM application resident on a subscriber's device is given priority over other services that may otherwise interfere with the VVM application obtaining new voicemails from a voicemail server.

Upon request from the GGSN 130, the PME 164 may return the assigned priority level for a service. The GGSN 130 may store the priority level for the requested service to use in comparisons with priority levels for services in subsequent service requests. For example, if a first requested service is web browsing followed by a VVM application, the web browsing service would temporarily be suspended to allow the VVM application to retrieve a new voicemail. At a time thereafter, the web browsing service is reactivated. The functionality of the PME 164 is described in greater detail below with reference to FIG. 3.

Figure 2:
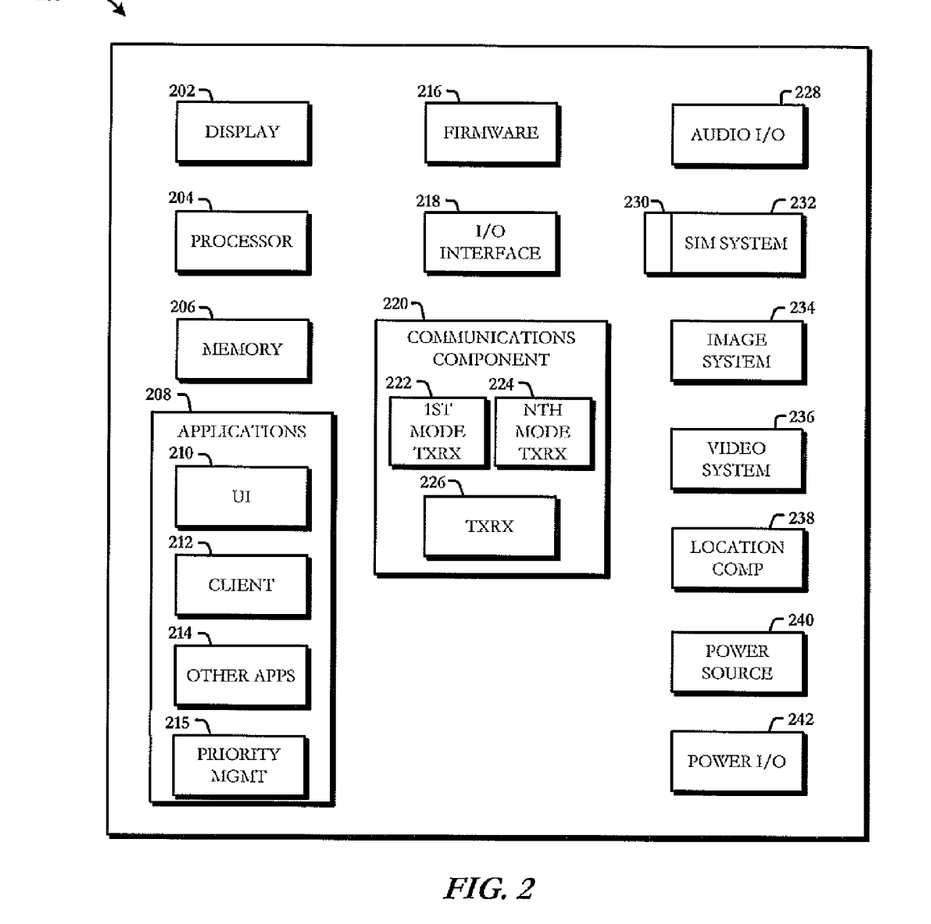
FIG. 2 schematically illustrates an exemplary mobile communications device and components thereof, according to some embodiments of the present disclosure.

Referring now to FIG. 2, a schematic block diagram of an exemplary mobile device 200 is illustrated. Although connections are not shown between the components illustrated in FIG. 2, the components can interact with each other to carry out device functions. In some embodiments, for example, the components are arranged so as to communicate via one or more busses (not shown). It should be understood that FIG. 2 and the following description are intended to provide a general understanding of a suitable environment in which the various aspects of some embodiments of the present disclosure can be implemented.

In some embodiments, the mobile devices 102, 104, 136, 138 illustrated in FIG. 1 are configured like the mobile device 200, now described in detail. In some embodiments, the mobile device 200 is a multimode headset and has a variety of computer-readable media, including, for example, volatile media, non-volatile media, removable media, and non-removable media. The term computer-readable media and variants thereof, as used in the specification and claims, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other tangible medium that can be used to store the desired information and that can be accessed by the mobile device 200.

As illustrated in FIG. 2, the mobile device 200 includes a display 202 for displaying multimedia such as, for example, voicemail notification messages, application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The display 202 may display visual voicemail data in visual voicemail headers, such as the date, time, message length, message status (i.e., new-unread, read, saved, or deleted), and calling line identity (CLI) information. The illustrated mobile device 200 also includes a processor 204 for processing data and/or executing computer-executable instructions of one or more applications 208, and a memory 206 for storing data and/or one or more of the applications.

In some embodiments, the application(s) 208 include a user interface (UI) application 210. The UI application 210 interfaces with a client 212 (e.g., an operating system (OS)) to facilitate user interaction with device functionality and data. In some embodiments, the client 212 is one of Symbian OS, Microsoft® Windows® Mobile OS (available from Microsoft Corporation of Redmond, Wash.), Palm® webOS™ (available from Palm Corporation of Sunnyvale, Calif.), Palm® OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 210 aids a user in entering message content, viewing received messages (e.g., multimedia messages, SMS messages, visual voicemail messages), managing voicemails in a visual voicemail application, answering/initiating calls, entering/deleting data, entering and setting user IDs and passwords for device access, configuring settings, manipulating address book content and/or settings, multimode interaction, interacting with other applications 214, and the like. In some embodiments, the other applications 214 include, for example, visual voicemail applications, messaging applications (e.g., SMS, EMS, MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 208 are stored in the memory 206 and/or in a firmware 216, and are executed by the processor 204. The firmware 216 may also store code for execution during device power up, for example.

The mobile device 200 also includes a device-based priority management engine (PME) 215. In some embodiments, the device PME 215 is configured to determine a priority for a requested application and request the determined priority when establishing a PDP context or using an existing PDP context. By way of example, the device PME 215 may determine a priority for a requested application based upon various factors including, but not limited to, a current time, a current device location, a serving network location, associated network load at the serving network location (e.g., SGSN, GGSN, RNC, BSC, MSC BTS, node-B loads), requested application type (e.g., real-time or delay-sensitive application vs. non-real-time or non-delay-sensitive application), user preferences (e.g., user-defined priorities for applications).

In some embodiments, the device PME 215 is configured to append a priority level to an Activate PDP Context request for a requested application sent from the mobile device 200 to the SGSN 112. The SGSN 112 may forward the priority level to the network PME 164 or the GGSN 130, whereat it is determined whether access to the requested application can be provided at the requested priority level. Alternatively, the SGSN 112 makes this determination.

In the case that at least one other application is running on the mobile device 200 when the mobile device 200 requests access to the requested application, the PME 164, GGSN 130, or SGSN 112, as appropriate, will determine whether network resources and other factors, such as those described above but from the network's perspective, permit a new PDP context to be established for the requested application. Alternatively, an application utilizing an existing PDP context may be suspended if it is assigned a lower priority than the priority level of the requested application. The suspended application may be allowed to resume use of a PDP context after the requested application is terminated. This is particularly useful for applications that use the same APN.

For applications that use different APNs, a new PDP context may need to be established. Alternatively, in some embodiments, applications are dynamically routed to APNs to further conserve network resources. For example, a VVM application may be routed to use an Internet APN if a PDP context has already been established for an Internet application, such as video streaming, audio streaming, Internet browsing, and the like. In this example, routing functions are appropriately deployed with the network to facilitate such a feature.

In some embodiments, a priority level is established by the device PME 215 and is the only priority level established for a given application. In other embodiments, the device PME 215 suggests a priority level that may be accepted or rejected by the network PME 164, the GGSN 130, the SGSN 112 or other serving node. In still other embodiments, described below with reference to FIG. 3, priority levels are managed in the network at the PME 164 and PDP contexts are selectively suspended, activated, or deactivated based upon the priority levels established by the PME 164 based upon user preferences, location, service provider preferences, network load preferences, and other criteria described above.

The illustrated mobile device 200 also includes an input/output (I/O) interface 218 for input/output of data, such as, for example, voicemail account information requests, visual voicemail management, location information, presence status information, user IDs, passwords, and application initiation (start-up) requests. In some embodiments, the I/O interface 218 is a hardwire connection, such as, for example, a USB, mini-USB, audio jack, PS2, IEEE 1394, serial, parallel, Ethernet (RJ48) port, RJ11 port, or the like. In some embodiments, the I/O interface 218 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 218 may be used for communications between the mobile device 200 and a network or local device, instead of, or in addition to, a communications component 220.

The communications component 220 interfaces with the processor 204 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 220 includes a multimode communications subsystem for providing cellular communications via different cellular technologies. In some embodiments, for example, a first cellular transceiver 222 operates in one mode, such as, GSM, and an Nth cellular transceiver 224 operates in a different mode, such as UMTS. While only two cellular transceivers 222, 224 are illustrated, it should be appreciated that a plurality of transceivers can be included.

The illustrated communications component 220 also includes an alternative communications transceiver 226 for use by other communications technologies such as, for example, WIFI, WIMAX, BLUETOOTH, infrared, infrared data association (IRDA), near field communications (NFC), RF, and the like. In some embodiments, the communications component 220 also facilitates reception from terrestrial radio networks, digital satellite radio networks, Internet-based radio services networks, combinations thereof, and the like.

The communications component 220 processes data from a network such as, for example, the Internet, an intranet (e.g., business intranet), a home broadband network, a WIFI hotspot, and the like, via an ISP, DSL provider, or broadband provider. In some embodiments, the communications component 220 facilitates the transmission of authentication information from the mobile device 200 to a network for processing in accordance with the methods described herein.

Audio capabilities for the mobile device 200 can be provided by an audio I/O component 228 that includes a speaker for the output of audio signals and a microphone to collect audio signals.

The illustrated mobile device 200 also includes a slot interface 230 for accommodating a subscriber identity system 232 such as, for example, a subscriber identity module (SIM) card, universal SIM (USIM) card, or universal integrated circuit card (UICC) including one or more SIM applications (e.g., ISIM, SIM, USIM, CSIM). Alternatively, the subscriber identity system 232 may be manufactured into the mobile device 200, thereby obviating the need for a slot interface 230. In some embodiments, the subscriber identity system 232 is programmed by a manufacturer, a retailer, a user, a computer, a network operator, or the like. The subscriber identity system 232 may be configured to store voicemail account information, contact information for the user and/or address book contacts, and/or other information.

The illustrated mobile device 200 also includes an image capture and processing system 234 (image system). Photos may be obtained via an associated image capture subsystem of the image system 234, for example, a camera. The illustrated mobile device 200 also includes a video system 236 for capturing, processing, recording, modifying, and/or transmitting video content. Photos and videos obtained using the image system 234 and the video system 236, respectively, may be added as message content to an MMS message and sent to another mobile device.

The illustrated mobile device 200 also includes a location component 238 for sending and/or receiving signals such as, for example, GPS data, assisted GPS (A-GPS) data, WIFI/WIMAX and/or cellular network triangulation data, combinations thereof, and the like, for determining a location of the mobile device 200. In some embodiments, the location component 238 interfaces with cellular network nodes, telephone lines, satellites, location transmitters and/or beacons, wireless network transmitters and receivers, for example, WIFI hotspots, radio transmitters, combinations thereof, and the like. Using the location component 238, the mobile device 200 obtains, generates, and/or receives data to identify its location, or transmits data used by other devices to determine the location of the mobile device 200.

The illustrated mobile device 200 also includes a power source 240, such as batteries and/or other power subsystem (AC or DC). The power source 240 can interface with an external power system or charging equipment via a power I/O component 242.

Figure 3:
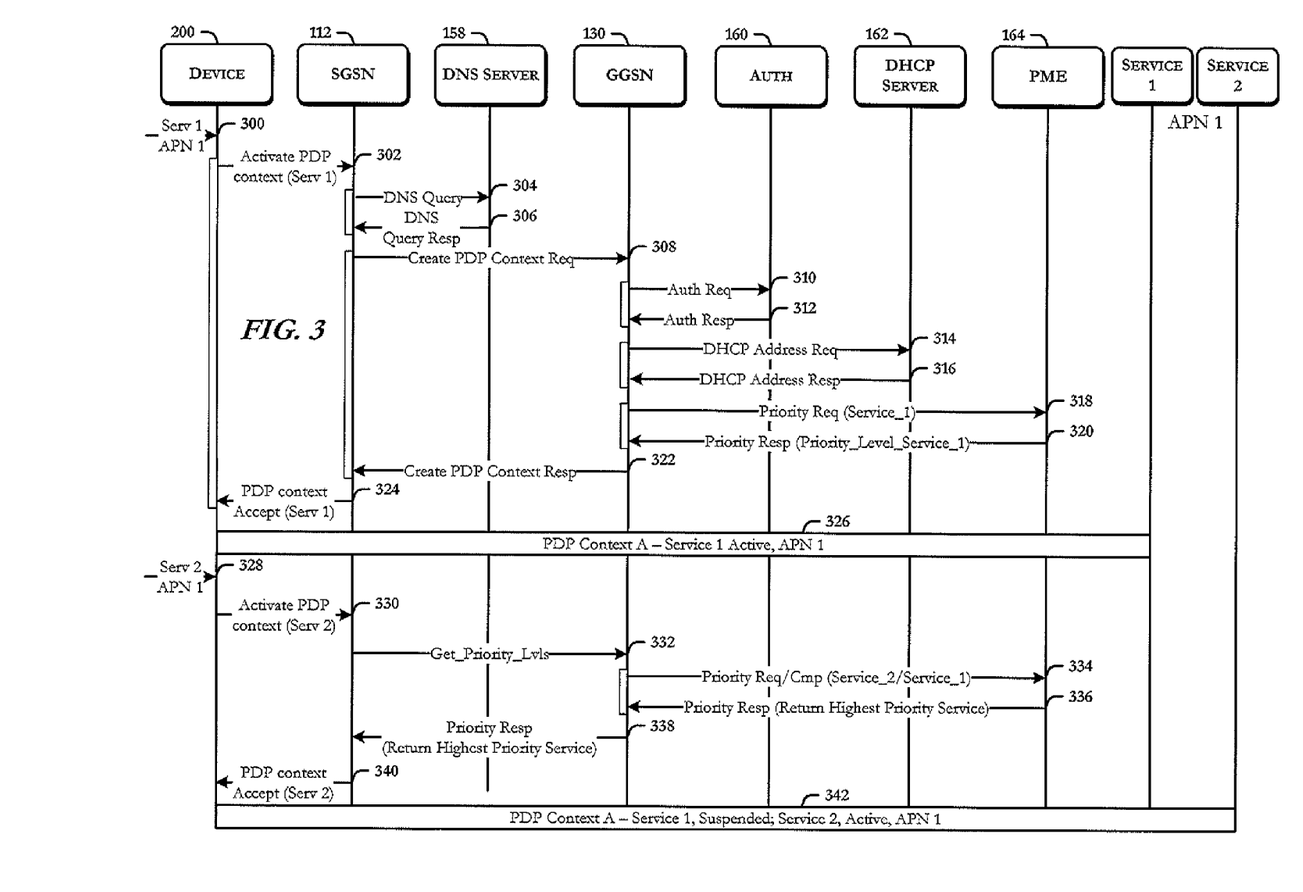
FIG. 3 schematically illustrates an exemplary message flow for prioritizing applications within a single shared PDP context, according to some embodiments of the present disclosure.

Referring now to FIG. 3, an exemplary message flow diagram for prioritizing applications within a single shared PDP context is schematically illustrated. The message flow begins, at step 300, when a service (application) request is received at the mobile device 200. As illustrated, a service request for service 1 is requested. This prompts the mobile device 200 to request a PDP context to be activated to access service 1 through APN 1. APN 1 is appended to the request. The request is formatted as an Activate PDP Context request as is typical for a PDP context activation sequence.

At step 302, the Activate PDP Context request is sent to the SGSN 112. At step 304, the SGSN 112 initiates a DNS query to the DNS server 158 to find the GGSN (e.g., the GGSN 130) corresponding to the APN specified by the mobile device 200 in the Activate PDP Context request. At step 306, the DNS server 158 provides the IP address for the serving GGSN (illustrated as the GGSN 130) to the SGSN 112. At step 308, the SGSN 112 sends a Create PDP Context request to the GGSN 130 corresponding to the APN. At step 310, the GGSN 130 sends an authentication request to the authentication server 160 to authenticate the data service (e.g., GPRS) account of the subscriber associated with the mobile device 200. The authentication server 160 authenticates the GPRS subscription and replies back to the GGSN 130, at step 312. At step 314, the GGSN 130 requests a dynamic IP address from the DHCP server 162. At step 316, the DHCP server 162 returns an IP address to the GGSN 130.

At step 318, the GGSN 130 requests a priority level from the PME 164 in a Priority Req (Service_1) message. At step 320, the PME 164 returns the assigned priority level for service 1 to the GGSN 130. The GGSN 130 may store the priority level for service 1 to use in comparisons with priority levels for services in subsequent service requests. At step 322, the GGSN 130 responds to the SGSN 112 with the IP address. At step 324, the SGSN 112 replies back to the mobile device 200 to signal completion of the PDP context activation sequence.

At this point, a PDP context has been established between the mobile device 200 and APN 1 to facilitate access to service 1. This PDP context is illustrated as PDP context A with service 1 active via APN 1 (326). At step 328, the mobile device 200 receives a second service request for service 2 also on APN 1. Upon receipt of the second service request, at step 330, the mobile device 200 sends an Activate PDP Context request for service 2 to the SGSN 112. At step 332, upon receipt of the Activate PDP Context request and based upon the known established PDP context A, the SGSN 112 sends a Get_Priority_Lvls message to the GGSN 130 to request the priority level for the requested application (service 2) and the presently served application (service 1).

At step 334, the GGSN 130 sends a Priority Req message to the PME 164. If the GGSN 130 has not stored the priority level for service 1, at step 336, the PME 164 sends both priority levels in a Priority Resp message to the GGSN 130. Alternatively, at step 336, if the GGSN 130 has stored the priority level for service 1, the PME 164 returns only the priority level for service 2. In general, the GGSN 130 is configured to compare the priority levels for both (or any number of) services and instruct the SGSN 112 to respond to the Activate PDP Context request appropriately depending upon whether service 2 is assigned a higher priority level than service 1.

Alternatively, at step 334, the GGSN 130 sends a Priority Cmp message to the PME 164, instructing the PME 164 to compare the priority level for any existing service (e.g., service 1 in the illustrated embodiment) to the priority level for the requested service which, in this case, is service 2. In the illustrated embodiment, the PME 164 returns service 2 as having the highest priority.

At step 338, the GGSN 130 returns the highest priority service to the SGSN 112. At step 340, the SGSN 112 responds to the mobile device's Activate PDP Context request with at PDP Accept message for service 2. This response causes the mobile device 200 to suspend PDP context A for service 1 and PDP context A is used for service 2. After service 2 is no longer needed, the mobile device 200 reverts back to service 1 using PDP context A without needing to reestablish a PDP context or utilize an additional PDP context.

The illustrated embodiments allow the mobile device 200 to perform normally in requesting PDP contexts and do not necessarily need to have knowledge of a particular service's priority level. As such, the first Activate PDP context request is typical, as is the second Activate PDP context request. The SGSN 112, the GGSN 130, and the PME 164 communicate to determine the priority for a requested service and return a PDP context accept message to the mobile device 200, instructing the mobile device 200 to access the higher priority service using the established PDP context A. The illustrated embodiment is not limited to two applications and is equally applicable to three or more applications.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
   receiving, at a gateway support node from a serving gateway support node, a create request to create a packet data protocol context, the create request comprising an access point name and a first service identifier associated with a first requested service;
   sending, from the gateway support node to a priority management engine, a priority request comprising the first service identifier associated with the first requested service;
   receiving, at the gateway support node from the priority management engine in response to the priority request, a first priority level associated with the first requested service;
   sending, by the gateway support node to the serving gateway support node, an internet protocol address for use in establishing the packet data protocol context between a mobile device and an access point associated with the access point name so that the mobile device can access the first requested service;
   receiving, at the gateway support node from the serving gateway support node, a get priority message comprising a request for the first priority level associated with the first requested service and a second priority level associated with a second requested service;
   sending, by the gateway support node to the priority management engine, a compare request instructing the priority management engine to compare the first priority level associated with the first requested service to the second priority level associated with the second requested service;
   in response to the compare request, receiving, at the gateway support node from the priority management engine, an indication of the second requested service as having a highest priority level; and
   sending, from the gateway support node to the serving gateway support node, a priority response comprising the indication of the second requested service.

2. The method of claim 1, wherein the first priority level associated with the first requested service is determined by the priority management engine based upon a priority factor established for the first requested service, and wherein the priority factor is selected from a group consisting of a network load factor, a geographical factor, a user preference factor, a subscriber feedback factor, a user specified factor, a service provider specified factor, a service-specific factor, a time-sensitive factor, a delay-sensitive factor, a location-specific factor, and a network resource factor.

3. The method of claim 1, wherein the second priority level associated with the second requested service is determined by the priority management engine based upon a priority factor established for the second requested service, and wherein the priority factor is selected from a group consisting of a network load factor, a geographical factor, a user preference factor, a subscriber feedback factor, a user specified factor, a service provider specified factor, a service-specific factor, a time-sensitive factor, a delay-sensitive factor, a location-specific factor, and a network resource factor.

4. The method of claim 1, further comprising storing, at the gateway support node after receiving the first priority level associated with the first requested service from the priority management engine in response to the priority request, the first priority level associated with the first requested service.

5. The method of claim 1, wherein the serving gateway support node provides, in response to the priority response from the gateway support node, a message to the mobile device instructing the mobile device to suspend the first requested service such that the packet data protocol context is used for the second requested service.

6. The method of claim 1, wherein the first priority level associated with the first requested service provided by the priority management engine is assigned by a user of the mobile device.

7. The method of claim 1, wherein the first requested service and the second requested service are each selected from a group of services consisting of: a visual voicemail service, an internet access service, an audio streaming service, a video streaming service, an online gaming service, an internet television service, a first service associated with a data application stored on the mobile device, a second service associated with a data application accessible by the mobile device via an internet application stored on the mobile device, a time-sensitive service, a delay-sensitive service, a location-specific service, and a network resource intensive service.

8. A non-transitory computer-readable medium that stores computer-executable instructions which, when executed by a processor of a gateway support node, cause the processor to perform operations comprising:
receiving, from a serving gateway support node, a create request to create a packet data protocol context, the create request comprising an access point name and a first service identifier associated with a first requested service;
sending, to a priority management engine, a priority request comprising the first service identifier associated with the first requested service;
receiving, from the priority management engine in response to the priority request, a first priority level associated with the first requested service;
sending, to the serving gateway support node, an internet protocol address for use in establishing the packet data protocol context between a mobile device and an access point associated with the access point name so that the mobile device can access the first requested service;
receiving, from the serving gateway support node, a get priority message comprising a request for the first priority level associated with the first requested service and a second priority level associated with a second requested service;
sending, to the priority management engine, a compare request instructing the priority management engine to compare the first priority level associated with the first requested service to the second priority level associated with the second requested service;
in response to the compare request, receiving, from the priority management engine, an indication of the second requested service as having a highest priority level; and
sending, to the serving gateway support node, a priority response comprising the indication of the second requested service.

9. The non-transitory computer-readable medium of claim 8, wherein the first priority level associated with the first requested service is determined by the priority management engine based upon a priority factor established for the first requested service, and wherein the priority factor is selected from a group consisting of a network load factor, a geographical factor, a user preference factor, a subscriber feedback factor, a user specified factor, a service provider specified factor, a service-specific factor, a time-sensitive factor, a delay-sensitive factor, a location-specific factor, and a network resource factor.

10. The non-transitory computer-readable medium of claim 8, wherein the second priority level associated with the second requested service is determined by the priority management engine based upon a priority factor established for the second requested service, and wherein the priority factor is selected from a group consisting of a network load factor, a geographical factor, a user preference factor, a subscriber feedback factor, a user specified factor, a service provider specified factor, a service-specific factor, a time-sensitive factor, a delay-sensitive factor, a location-specific factor, and a network resource factor.

11. The non-transitory computer-readable medium of claim 8, wherein the operations further comprise storing, after receiving the first priority level associated with the first requested service from the priority management engine in response to the priority request, the first priority level associated with the first requested service.

12. The non-transitory computer-readable medium of claim 8, wherein the serving gateway support node provides, in response to the priority response from the gateway support node, a message to the mobile device instructing the mobile device to suspend the first requested service such that the packet data protocol context is used for the second requested service.

13. The non-transitory computer-readable medium of claim 8, wherein the first priority level associated with the first requested service provided by the priority management engine is assigned by a user of the mobile device.

14. The non-transitory computer-readable medium of claim 8, wherein the first requested service and the second requested service are each selected from a group of services consisting of: a visual voicemail service, an internet access service, an audio streaming service, a video streaming service, an online gaming service, an internet television service, a first service associated with a data application stored on the mobile device, a second service associated with a data application accessible by the mobile device via an internet application stored on the mobile device, a time-sensitive service, a delay-sensitive service, a location-specific service, and a network resource intensive service.

15. A gateway support node comprising:
a processor; and
a memory that stores instructions that, when executed by the processor, cause the processor to perform operations comprising:
receiving, from a serving gateway support node, a create request to create a packet data protocol context, the create request comprising an access point name and a first service identifier associated with a first requested service,
sending, to a priority management engine, a priority request comprising the first service identifier associated with the first requested service, receiving, from the priority management engine in response to the priority request, a first priority level associated with the first requested service, sending, to the serving gateway support node, an internet protocol address for use in establishing the packet data protocol context between a mobile device and an access point associated with the access point name so that the mobile device can access the first requested service, receiving, from the serving gateway support node, a get priority message comprising a request for the first priority level associated with the first requested service and a second priority level associated with a second requested service, sending, to the priority management engine, a compare request instructing the priority management engine to compare the first priority level associated with the first requested service to the second priority level associated with the second requested service, in response to the compare request, receiving, from the priority management engine, an indication of the second requested service as having a highest priority level, and sending, to the serving gateway support node, a priority response comprising the indication of the second requested service.

16. The gateway support node of claim 15, wherein the first priority level associated with the first requested service is determined by the priority management engine based upon a first priority factor established for the first requested service and the second priority level associated with the second requested service is determined by the priority management engine based upon a second priority factor established for the second requested service, and wherein the first priority factor and the second priority factor are selected from a group consisting of a network load factor, a geographical factor, a user preference factor, a subscriber feedback factor, a user specified factor, a service provider specified factor, a service-specific factor, a time-sensitive factor, a delay-sensitive factor, a location-specific factor, and a network resource factor.

17. The gateway support node of claim 15, wherein the operations further comprise storing, after receiving the first priority level associated with the first requested service from the priority management engine in response to the priority request, the first priority level associated with the first requested service.

18. The gateway support node of claim 15, wherein the serving gateway support node provides, in response to the priority response from the gateway support node, a message to the mobile device instructing the mobile device to suspend the first requested service such that the packet data protocol context is used for the second requested service.

19. The gateway support node of claim 15, wherein the first priority level associated with the first requested service provided by the priority management engine is assigned by a user of the mobile device.

20. The gateway support node of claim 15, wherein the first requested service and the second requested service are each selected from a group of services consisting of: a visual voicemail service, an internet access service, an audio streaming service, a video streaming service, an online gaming service, an internet television service, a first service associated with a data application stored on the mobile device, a second service associated with a data application accessible by the mobile device via an internet application stored on the mobile device, a time-sensitive service, a delay-sensitive service, a location-specific service, and a network resource intensive service.

* * * * *